Nov. 9, 1965

G. DAVIES ETAL 3,216,778

CINEMATOGRAPH APPARATUS

Filed Oct. 22, 1962

INVENTORS
GEORGE DAVIES
HEDDA WERTHEIMER

BY
Watson, Cole, Grindle & Watson
ATTORNEYS

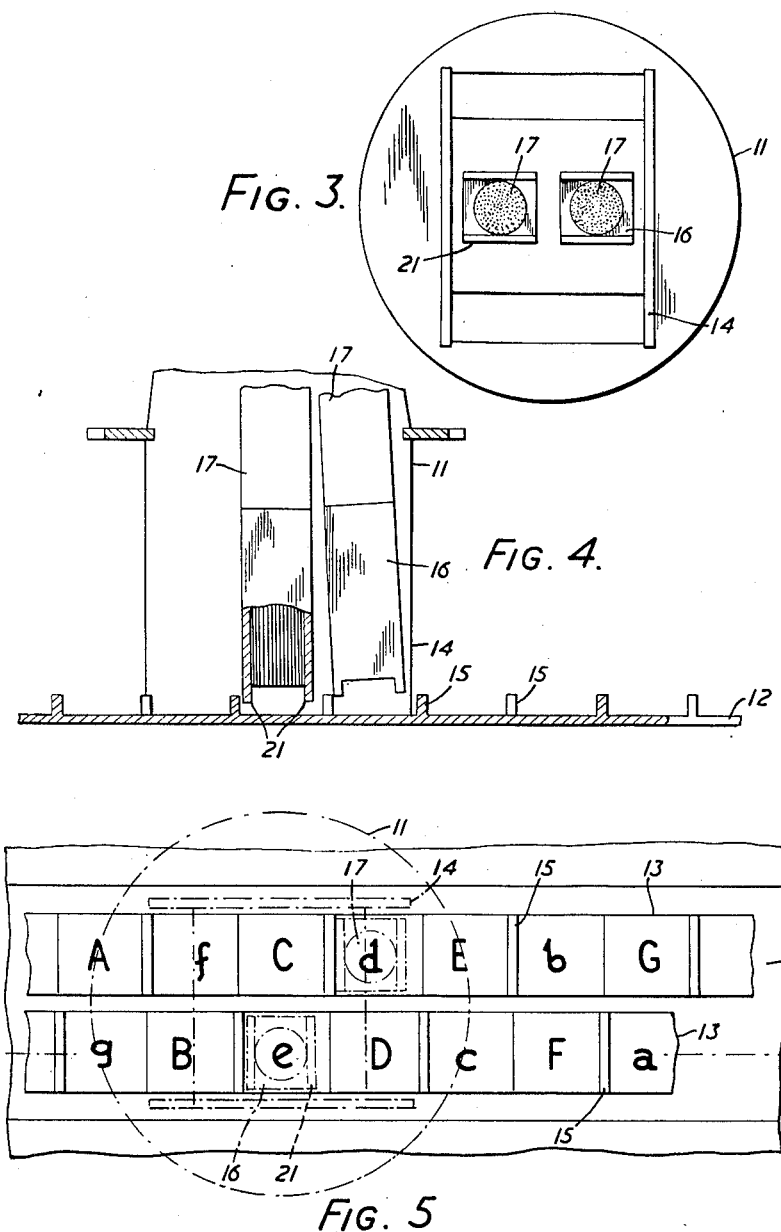

United States Patent Office 3,216,778
Patented Nov. 9, 1965

3,216,778
CINEMATOGRAPH APPARATUS
George Davies and Hedda Wertheimer, St. Brelade, Jersey, Channel Islands
Filed Oct. 22, 1962, Ser. No. 232,050
Claims priority, application Great Britain, Oct. 23, 1961, 37,936/61
8 Claims. (Cl. 352—129)

This invention relates to a novel system of viewing a cine-film and is concerned with a system suitable for use by an individual in his own time and at his own convenience. The cinematograph was developed always having in mind the need to display the film to a large audience in a cinema at a particular time and the present invention is concerned with quite a novel aspect. It is intended to enable a cine-film to be read in the manner of a book by an individual in his home using a simple scanner co-operating with the film and a viewer which may comprise a head-piece similar to a pair of spectacles.

According to one aspect of the present invention, a scanner for a sequence of cine-picture frames comprises a pair of feet of which one is arranged to be stationary over a frame while the other is moved from the preceding frame in the sequence to the succeeding frame. It is envisaged that the scanner shall be moved by the user sliding it over the sequence of picture frames.

The frames can be observed through optical cords and then the feet can be mounted at the ends of two optical cords which can flex to be capable of "walking" over two side-by-side series of picture frames. Each optical cord may be double so that a frame can be illuminated by light passing through one part of a cord while the image of the illuminated frame can be transmitted through the other part. The illumination may be electrical and each cord may then be associated with electrical conductors for energising a source of illumination when a foot is appropriately placed in relation to a picture frame.

According to a second aspect of the invention a cine-film contains two series of picture frames of which successive frames in a sequence of the film are alternately in one series and the other.

Conveniently the two series of frames are in parallel rows of frames and successive frames in the sequence are regularly spaced along the rows but alternately in one row and the other. It is clear that the continuation of the sequence can lead back along the two rows filling the alternate spaces.

It is envisaged that the film shall be formed on a sheet bearing several sequences of such frames, preferably in horizontal lines after the manner of the lines of print in a book, and then the user only needs to slide his scanner to and fro along the lines in turn.

For this purpose a sequence of two series of frames may be formed with guides for the scanner and preferably the guides are provided by making the two series of frames proud of the surface of the sheet.

A contact stop may be positioned in predetermined relation to each frame of a sequence to locate a scanning foot in relation to that frame and to make an electrical contact for a circuit including electrical means for illuminating the frame. The film itself may be pressed from thin anodised aluminum sheet to raise the frames from the surface and raise the contact stop from the frames and the anodising may be removed where electrical contacts are required at the contact stops and at the guide surfaces.

A further aspect of the invention is a combination of such a cine-film with such a scanner having an optical cord just large enough to cover one of the picture frames in a film. It is envisaged that the picture frames might be about 2½ mm. by 2 mm. in size, and it has been found that it is possible to obtain a good image in this way while yet a substantial sequence of film can be printed on one page the size of an average book.

The contact stop may be used to hold a scanning head stationary in relation to a frame in spite of limited movement of the scanner along the frame. In this way, one head can be held viewing its frame while the other moves from the preceding frame to the succeeding frame and then is held stationary by its contact stop as the first head moves on, and in this way the scanner "walks" over the film.

According to a further aspect of the invention a cine-viewer comprises a head-piece having a lens in combination with one end of an optical cord to provide an image for the user. There may be two lenses arranged for viewing through the two eyes of the user as in a spectacle frame, and each may be in combination with one end of a different optical cord.

The invention also includes a cine-system in which a scanner is moved by the user over a series of picture frames and images of the frames are transmitted to a viewer through optical cords.

The invention may be carried into practice in various ways and one specific embodiment together with some modifications will now be described with reference to the accompanying drawings, in which;

FIGURE 3 is an inverted plan view to an increased scale of the scanner of FIGURE 1;

FIGURE 4 is an elevation partly in section of the lower end of the scanner shown in FIGURE 3 and the co-operating part of the film; and FIGURE 5 is a diagrammatic plan view of the film showing how it co-operates with the scanner.

The cine-track to be read is in the form of a number of successive frames to be viewed in turn as with conventional cinematograph film. However, they are printed using transfer dyes on flat sheets of hard-rolled, thin, aluminum which has an anodised surface and they are arranged in a particular order to be described in more detail below.

Figure 1:
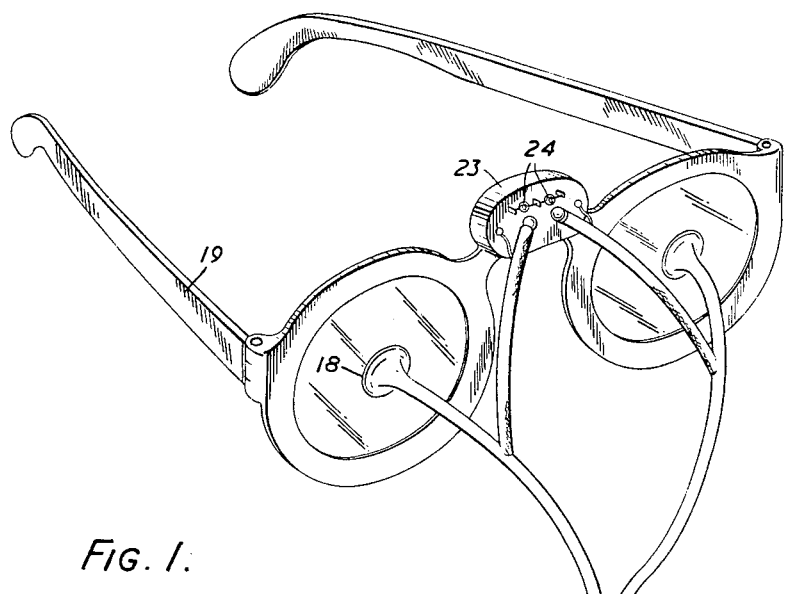
FIGURE 1 is a perspective view of a scanner and head-piece used in the embodiment.
Figure 2:
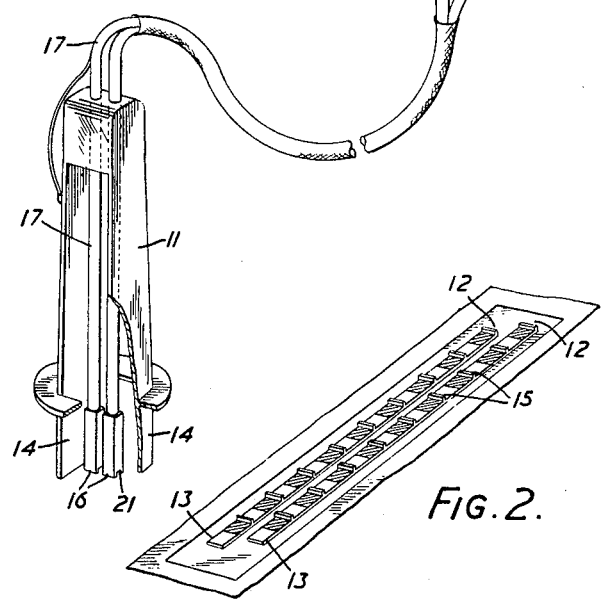
FIGURE 2 is a perspective view of a portion of film for co-operation with the scanner of FIGURE 1.

The frames are arranged in rows which are to be read in pairs and for this purpose the user has a reading instrument called a scanner 11 which he moves along each pair of rows 12, moving along one pair of rows and back again before transferring his scanner to the next pair and so on. In forming the metal sheet, the rows are pressed a little proud of the sheet as shown in FIGURE 2 so that the outer sides 13 of the two rows in one pair form parallel guides for guide plates 14 incorporated in the scanner and arranged to embrace the pair of rows. Also proud of the actual, raised frame-bearing surface are a number of locating contact ribs 15 which co-operate with feet 16 in the scanner.

The scanner is connected through two optical cords 17 with respective plastic lenses 18 contained in a head-piece in the form of a spectacle frame 19 which the user can wear. The head-piece may have an opaque hood.

As the user slides the scanner 11 along a pair of rows of frames, he sees through the plastic lenses 18 images of the individual frames in appropriate succession and gets the impression of a moving picture.

As has been suggested in the general description above, the scanner has a pair of guide plates 14 which guide its movement and which also support a pair of flexible legs constituted by the lower ends of the optical cords 17. The brass feet 16 at the lower end of the legs 17 are arranged side by side so that each passes over the frames in a different row of the pair of rows being scanned. The optical cords 17 terminate as shown in FIGURE 3 in the end faces of the feet 16 so that when a foot is appropriately positioned, the frame can be viewed through the optical cord.

The arrangement is that when one of the feet 16 is stationary over a frame in one row, the other foot moves from the preceding frame to the succeeding frame as the user slides the scanner along the pair of rows. For this purpose the frames are arranged in a sequence which proceeds along the two rows in turn. As shown in FIGURE 5, a frame A in one row is followed by a frame B in the next row, and then a frame C in the first row and so on. At the end of a pair of rows the frames continue back the other way using the remaining spaces which have been left, as can be seen in FIGURE 5 by the letters a, b, c, etc.

As can be seen best from FIGURE 4, each foot 16 is formed with two electrical contacts 21 at its leading and trailing edges and these engage the locating electrical contact ribs 15, each formed proud of the frame-bearing surface to hold the foot 16 stationary over its frame while the other foot is moving. When the other foot has moved through a distance equal to the width of one frame, one of its teeth 21 engages a locating contact rib 15 but the bending of the first leg due to the movement of the scanner allows the first contact tooth 21 to ride over its locating contact rib so that the first foot can move on to the next frame, while the second foot is stationary over the preceding frame.

In this way the operator only has to slide the scanner along the pair of rows of frames for the feet to walk over the cine-track and the optical cords to view the individual frames in the appropriate sequence, each frame being viewed by a cord while the cord is stationary for a small fraction of a second, depending upon the speed with which the scanner is moved along. No shutter is necessary and a succeeding frame is being scanned through its optical cord as soon as the other cord has left a preceding frame.

As has been described the two optical cords 17 each terminate in a plastic lens.

Normally the frame being scanned is not bright enough to produce a visible image at the lens and has to be illuminated, and for this purpose the head-piece also carries a small electric cell 23 arranged to light two very small electric lamps 24 in turn when either of two switches at the feet 16 on the scanner is closed. These switches are in fact each constituted by one of the electrical contact feet and a locating contact rib 15. The anodising is removed from the aluminum in each rib so that when the tooth 21 on a foot is in contact with that rib to hold the end of the optical cord over the frame, the switch is closed and the appropriate lamp 24 is lighted. A pair of electrical conductors 25 extending parallel with each optical cord 17 to its switch enable an electrical circuit to be completed including the cell 23, the lamp 24, the switch (15, 16) and the connection between the guide plates 14 and the sides 13 of the track.

The frame is illuminated through a random bundle of optical fibres arranged around the optical cord proper. There is one such bundle around each of the optical cords 17. Each leads from the appropriate lamp 24 to the lower end of the optical cord so that light from the filament is piped down the random cords to illuminate the frame and is then reflected and piped to the lens 18.

It will be clear that a frame is only illuminated when an optical cord is stationary above it and that as the switches close in turn, illumination is transferred from one frame to another. When a foot is advancing from a frame in one row to the next frame in the same row, those frames are not illuminated and so the eye does not see the apparent relative movement of the frame in relation to the scanner, and looks in turn at the successive illuminated stationary frames.

The successive frames A, B, C, etc. represent alternately left eye and right eye images of stereo-scopic pairs and these are led to the appropriate lenses 18 in the head-piece. Although the two eyes see their respective images in turn, if the movement is sufficiently fast, the impression is of a continuous picture with each eye, which combine to form the stereo-scopic image.

Alternatively of course both eyes could receive the same images if stereo-scopic pictures are not being used. Then each optical cord 17 will lead to both lenses 18, although they will be illuminated alternately.

The invention is equally applicable to black and white images or coloured images and is expected to be capable of cheap manufacture, the total cost depending mainly on the cost of the optical cords.

A very light filament is quite adequate so that a simple electric cell can have a long life. There are no moving parts other than the legs and the movement is provided by the user, so that no motor is necessary.

Apart from the optical cords the only optical components are the lenses in the spectacles, which are for producing an appropriate image and it is expected that these can be cheaply made of plastic material.

The films can be cheaply printed because they are in the flat and not in the form of a roll, and indeed it is envisaged that the most convenient form will be a book containing sheet metal leaves or pages carrying the rows of film frames. A sound track may extend parallel with the film frames for reproduction through conventional simple sound reproducing equipment which could be connected to an ear-phone.

With this equipment a user can obtain a visual moving picture with a commentary using cheap equipment at a time and at a rate to suit his individual requirement.

A preferred frame size is 2 mm. by 2½ mm. and the optical cords which might be about 14" long are of sufficient diameter to cover a single frame of this size. It seems that about 50 millilumens is sufficient power for the lamp, and indeed it is conceived that instead of using an electric cell it would be possible to generate the necessary electrical power electric-magnetically from the movement of the scanner.

What we claim as our invention and desire to secure by Letters Patent is:

1. A cine binocular viewing device for use with an image bearing strip having a guide strip and locating elements thereon comprising a pair of lenses mounted in a head piece, each having an optical cord in optical alignment therewith, each optical cord forming a flexible leg on which a scanning foot is mounted, and a pair of guide plates spaced for slidable co-operation with said guide strip, the flexible legs, feet and guide plates forming a hand held scanner adapted to be slidably moved over the image bearing strip, the locating elements thereon providing alternate temporary stops for the feet which walk as the scanner is moved along the strip.

2. A viewing device as claimed in claim 1 in which each optical cord is double having one part for transmission of light for illuminating an image and another part for transmission of the image.

3. A viewing device as claimed in claim 2 having separate sources of illumination associated with each light transmission part of each optical cord.

4. A viewing device as claimed in claim 3 in which each foot has an electrical contact connected to the source of illumination associated with the optical cord on which it is mounted and which closes an electric circuit to energize the corresponding source of illumination when said foot is stopped by a locating element.

5. An image bearing strip for use with a cine viewing device having scanning feet comprising a pair of parallel rows of images, the images in the respective rows being related and offset with respect to each other, and for co-operation with the scanning feet locating elements between each two images in each row and guide means running parallel to the rows.

6. An image bearing strip as claimed in claim 5 bearing a series of successive cine images, successive images in the series being regularly spaced along the rows, alternately in one row and the other.

7. An image bearing strip as claimed in claim 5 in which the images in the respective rows are proud of the surfaces of the strip to form said guide means.

8. An image bearing strip as claimed in claim 7 including an electrical contact stop positioned in predetermined relation to each image of said parallel rows for locating a scanning foot in relation to that image and for making electrical contact for a circuit including electrical means for illuminating the image.

References Cited by the Examiner
UNITED STATES PATENTS

| | | | |
|---|---|---|---|
| 1,642,918 | 9/27 | Bouin | 352—239 |
| 2,517,246 | 8/50 | Seitz et al. | |
| 3,004,368 | 10/61 | Hicks | 88—1 |
| 3,043,179 | 7/62 | Dunn | 88—1 |
| 3,068,772 | 12/62 | MacNeille | 88—1 |
| 3,091,235 | 5/63 | Richards. | |
| 3,143,589 | 8/64 | Brault et al. | 88—31 |

JULIA E. COINER, *Primary Examiner.*

NORTON ANSHER, *Examiner.*